United States Patent [19]

Steiner et al.

[11] Patent Number: 4,925,369
[45] Date of Patent: May 15, 1990

[54] EASILY REMOVED MARINE PROPELLER

[75] Inventors: Ronald M. Steiner; Roger E. Koepsel, both of Oshkosh; Hubert S. Gilgenbach, Butte des Morts; Terence C. Reinke, Oshkosh, all of Wis.

[73] Assignee: Brunswick Corporation, Skokie, Ill.

[21] Appl. No.: 114,459

[22] Filed: Oct. 28, 1987

[51] Int. Cl.$^5$ .............................................. B63H 1/20
[52] U.S. Cl. .............................. 416/204 R; 416/244 B; 403/334; 403/259
[58] Field of Search ................. 416/204, 244, 244 A, 416/244 B, 245 B; 403/15, 11, 334, 333, 259, 261, 356

[56] References Cited

U.S. PATENT DOCUMENTS

| 1,959,901 | 5/1934 | Buehle | 403/15 |
| 2,351,356 | 6/1944 | Meyer | 416/244 B |
| 2,862,733 | 2/1958 | Reiersen | 416/244 B |
| 3,061,342 | 10/1962 | Feller | 416/244 B |
| 3,307,634 | 3/1967 | Bihlmire | 416/244 B |
| 3,469,556 | 9/1969 | Campbell et al. | 416/244 B |
| 4,375,926 | 3/1983 | Feller | 416/244 B |

FOREIGN PATENT DOCUMENTS

| 6505591 | 5/1965 | Netherlands | 416/204 R |
| 229993 | 2/1969 | U.S.S.R. | 416/244 B |
| 569753 | 4/1974 | U.S.S.R. | 416/244 B |
| 488028 | 10/1975 | U.S.S.R. | 416/244 B |
| 611805 | 6/1978 | U.S.S.R. | 416/244 B |
| 956349 | 9/1982 | U.S.S.R. | 416/244 B |
| 1013346 | 4/1983 | U.S.S.R. | 416/244 B |
| 317469 | 7/1929 | United Kingdom | 416/244 |

Primary Examiner—Robert E. Garrett
Assistant Examiner—Therese M. Newholm
Attorney, Agent, or Firm—Andrus, Sceales, Starke & Sawall

[57] ABSTRACT

In a marine drive having a tapered propeller shaft section (14) and a tapered propeller hub (20, 60) matching and fitting therearound in flush contact, a relief inner diameter section (28, 66) is provided in the hub, spaced from the propeller shaft, to prevent flush contact and facilitate removal of the propeller hub from the propeller shaft. In a further embodiment, a thrust collar (50) with a substantially steeper tapered section (56) further facilitates removal.

4 Claims, 2 Drawing Sheets

EASILY REMOVED MARINE PROPELLER

BACKGROUND AND SUMMARY

The invention relates to mounting arrangements for marine propellers.

In an inboard marine drive, the propeller has a hub with a tapered inner diameter mounted to the end of the propeller shaft which is also tapered. The tapers are matched and provide flush contact between the propeller hub and the propeller shaft. To remove the propeller, a puller is needed, together with a significant amount of manual labor. This difficulty of removal persists even if lubricant is spread on the surfaces, because the lubricant is usually squeezed out during assembly.

The present invention addresses and solves the above noted removal problem.

DETAILED DESCRIPTION

Prior Art

Figure 1:
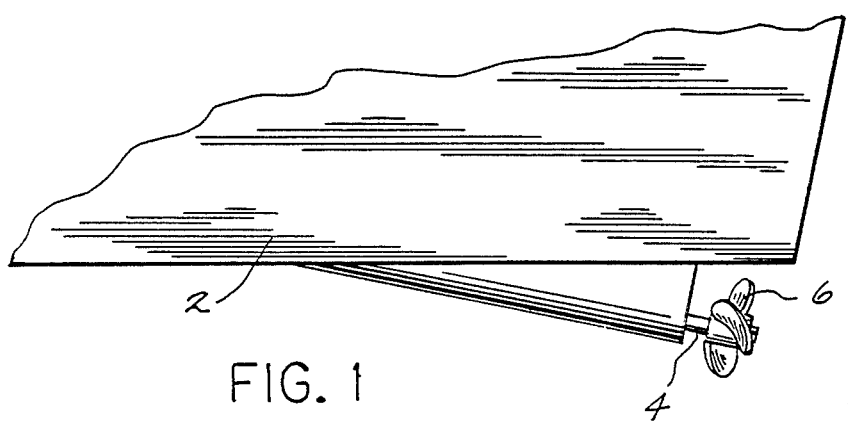
FIG. 1 shows a portion of an inboard marine drive.
Figure 2:
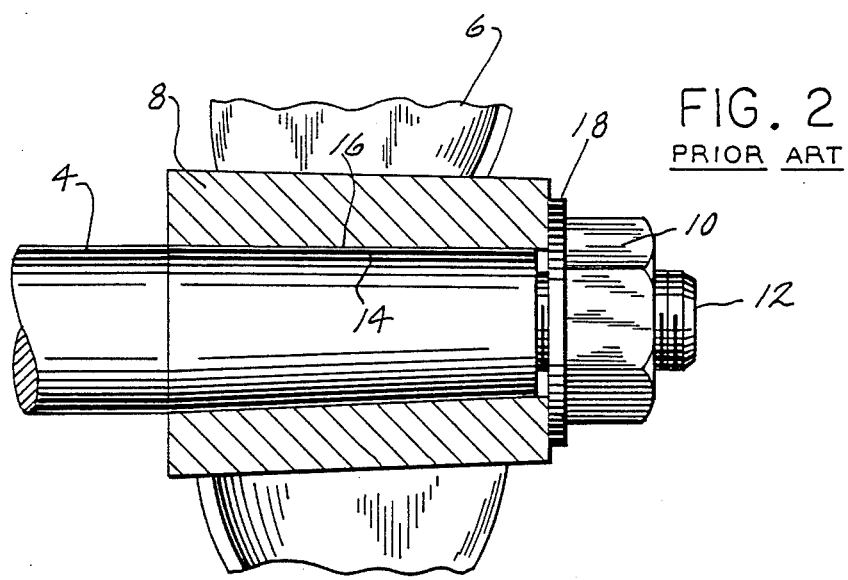
FIG. 2 shows a propeller mounting arrangement known in the prior art.

FIG. 1 shows an inboard marine drive including a boat hull 2 having a driven propeller shaft 4 extending therefrom. A propeller 6 having a propeller hub 8, FIG. 2, is mounted to propeller shaft 4 by nut 10 on threaded end 12 of the propeller shaft. Propeller shaft 4 has a tapered outer diameter section 14 receiving propeller hub 8 therearound. A standard taper is 1/16th inch per one inch length of shaft. Propeller hub 8 has a tapered inner diameter section 16 substantially matching and fitting around the propeller shaft at taper 14 and in flush contact therewith. Nut 10 bears against washer 18 which retains hub 8 on tapered section 14 of the propeller shaft. This arrangement is subject to the above noted problems with removal.

PRESENT INVENTION

Figure 3:
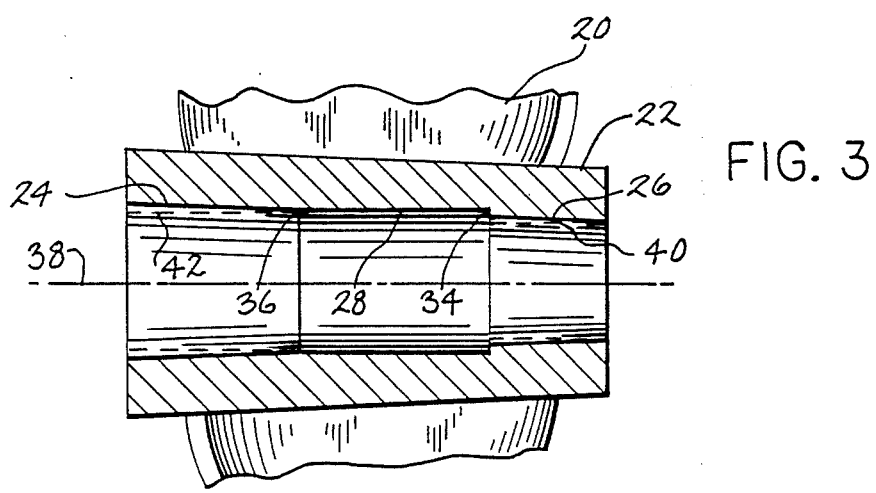
FIG. 3 shows a propeller hub in accordance with the invention.
Figure 4:
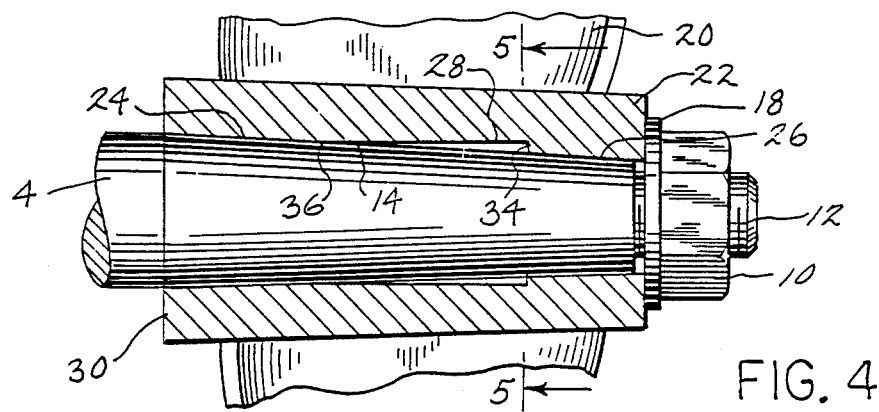
FIG. 4 shows the propeller hub of FIG. 3 mounted to a propeller shaft.
Figure 5:
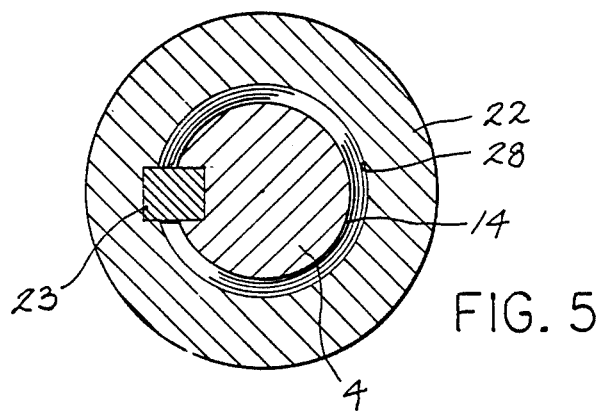
FIG. 5 is a sectional view taken along line 5—5 of FIG. 4.

FIGS. 3-5 show a propeller mounting arrangement in accordance with the invention and use like reference numerals from FIGS. 1 and 2 where appropriate to facilitate clarity. FIG. 3 shows a propeller 20 having a propeller hub 22 with inner diameter sections 24 and 26 substantially matching and fitting around propeller shaft 4 at taper 14, FIG. 4, and in flush contact therewith. Propeller hub 22 is retained on propeller shaft 4 by nut 10 and washer 18, as in FIG. 2. Propeller hub 22 is keyed to propeller shaft 4 by key 23, FIG. 5, as is standard in the prior art.

Propeller hub 22 has an inner diameter relief section 28 spaced from propeller shaft taper section 14 to prevent flush contact therewith and facilitate removal of propeller hub 22 from propeller shaft 4. Relief section 28 reduces the total area of flush contact between the propeller hub and the propeller shaft. This reduces the contact force and friction which must be overcome to remove the propeller. It has been found that a puller is not needed, even if no lubricant has been applied. The operator merely strikes the forward face 30 of the propeller hub with a drift punch or similar device. Furthermore, if lubricant is used, relief section 28 enables some lubricant to remain after installation, which further facilitates ease of removal.

Forward and rearward inner diameter tapered sections 24 and 26, respectively, of the propeller hub are in flush contact with the propeller shaft tapered section 14. Inner diameter relief section 28 of the propeller hub is between forward and rearward sections 24 and 26. Relief section 28 meets rearward section 26 at an annular step reduction shoulder interface 34. Relief section 28 meets forward section 24 at a transition angle 36 interrupting the taper of the inner diameter of propeller hub 22.

Propeller hub 22 has a central axis 38, FIG. 3, coincident with the rotational axis of propeller shaft 4. Forward section 24 of the inner diameter of the propeller hub extends rearwardly and tapers inwardly toward propeller shaft axis 38. Relief section 28 of the inner diameter of the propeller hub extends from forward section 24 rearwardly and parallel to propeller shaft axis 38 such that the radial gap between the propeller shaft taper section 14 and relief section 28 increases as the relief section extends rearwardly. Rearward section 26 of the inner diameter of the propeller hub extends rearwardly from relief section 28 and tapers inwardly toward propeller shaft axis 38.

Propeller hub 22 is formed as a cast member having a first inner diameter cast section 40, as shown in dashed line in FIG. 3, and a second larger inner diameter cast section 42 meeting first section 40 at annular step reduction shoulder 34. The inner diameter of hub 22 is machined to provide tapered rearward section 26 at first section 40, and to provide tapered forward section 24 at the forward portion of second section 42.

Figure 6:
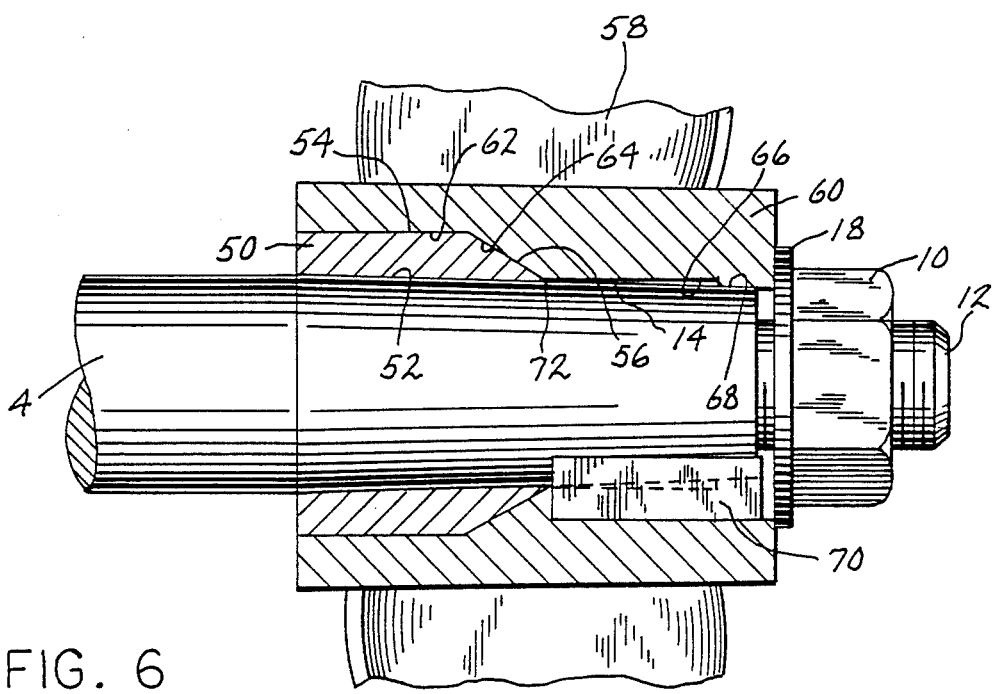
FIG. 6 shows an alternate embodiment of a propeller mounting arrangement in accordance with the invention.

FIG. 6 shows an alternate embodiment in accordance with the invention, and uses like reference numerals from FIGS. 1-5 where appropriate to facilitate clarity. A thrust collar 50 is provided around tapered section 14 of propeller shaft 4. Collar 50 has a tapered inner diameter 52 substantially matching and fitting around propeller shaft taper section 14 and in flush contact therewith. Thrust collar 50 has a forward section 54 of constant outer diameter, and a rearward section 56 of tapered outer diameter, which taper is substantially steeper than the taper of inner diameter 52 and propeller shaft taper 14.

Propeller 58 has a propeller hub 60 received around collar 50 and propeller shaft taper section 14. Propeller hub 60 has a forward enlarged inner diameter section 62 engaging the outer diameter of forward section 54 of the collar. Propeller hub 60 has a forward tapered inner diameter section 64 of the noted substantially steeper taper engaging the outer diameter of the rearward collar section 56. Propeller hub 60 has an intermediate relief inner diameter section 66 spaced from propeller shaft taper section 14 to prevent flush contact therewith. Propeller hub 60 has a rearward tapered inner diameter section 68 substantially matching and fitting around propeller shaft taper section 14 and in flush contact therewith. Propeller hub 60 is keyed to the propeller shaft by key 70 extending axially along rearward section 68 and intermediate section 66 of the propeller hub but not along collar 50. Collar 50 is not keyed to propeller shaft 4 nor to propeller hub 60.

Relief section 66 of propeller hub 60 and the steeper taper of the rearward collar section 56 and hub inner diameter section 64 facilitate removal of propeller hub 60 from propeller shaft 4. Steeply tapered collar section 56 meets the inner diameter collar tapered section 52 at the latter's intersection 72 with relief section 66, which intersection forms the inner diameter transition angle, comparably to angle 36 in FIG. 3.

It is recognized that various equivalents, alternatives and modifications are possible within the scope of the appended claims.

We claim:

1. A marine drive comprising a propeller shaft having a tapered outer diameter, a thrust collar around said propeller shaft, said collar having a tapered nonthreaded inner diameter substantially matching and fitting around said propeller shaft and in flush contact therewith, said collar having a forward section of given outer diameter and a rearward section of tapered outer diameter which taper is substantially steeper than the taper of said inner diameter of said collar and said outer diameter of said propeller shaft, said forward and rearward sections of said collar forming a knee at an obtuse angle, a propeller hub received around said collar and said propeller shaft, said propeller hub having a forward enlarged inner diameter section engaging said outer diameter of said forward section of said collar, said propeller hub having a forward tapered inner diameter section of said substantially steeper taper engaging said outer diameter of said rearward section of said collar, said propeller hub having a rearward tapered inner diameter section substantially matching and fitting around said propeller shaft and in flush contact therewith, said forward enlarged inner diameter section and said forward tapered inner diameter section of said propeller hub forming a receiving knee at an obtuse angle substantially the same as said first mentioned obtuse angle and receiving said first mentioned knee.

2. The invention according to claim 1 wherein said propeller hub is keyed to said propeller shaft by a key extending axially along said rearward section of said propeller hub but not along said collar, wherein said key transfers rotational drive from said propeller shaft to said propeller hub.

3. The invention according to claim 1 wherein said propeller hub has an intermediate relief inner diameter section spaced from said propeller shaft to prevent flush contact therewith.

4. The invention according to claim 3 wherein said relief section is between said collar and said rearward tapered inner diameter section of said propeller hub.

* * * * *